March 30, 1937. E. K. BENEDEK 2,075,567
STEERING MECHANISM FOR VEHICLES
Filed Nov. 6, 1934 3 Sheets-Sheet 1
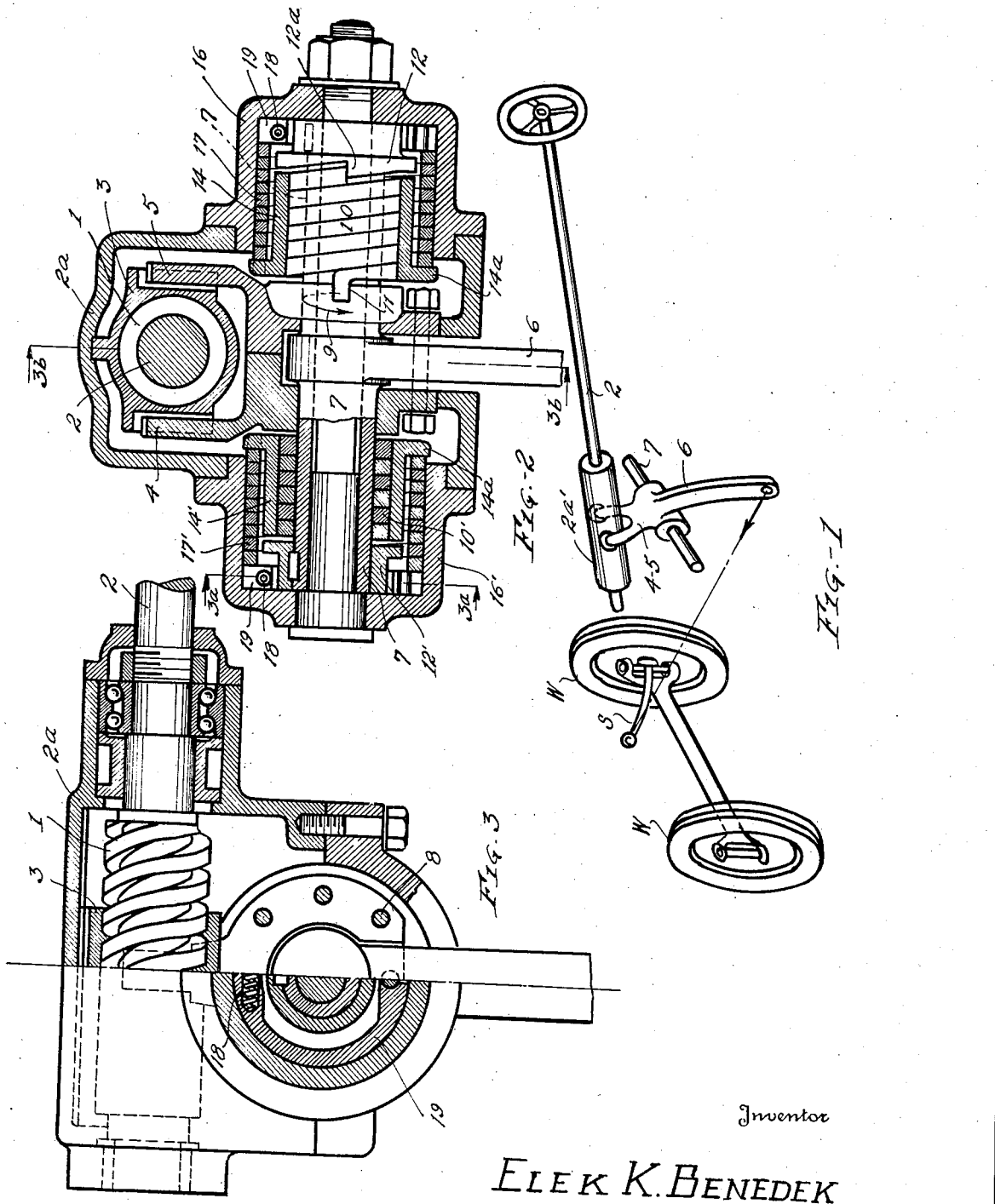
Inventor
ELEK K. BENEDEK
By Soule & Leonard
Attorneys March 30, 1937.  E. K. BENEDEK  2,075,567
STEERING MECHANISM FOR VEHICLES
Filed Nov. 6, 1934  3 Sheets-Sheet 2
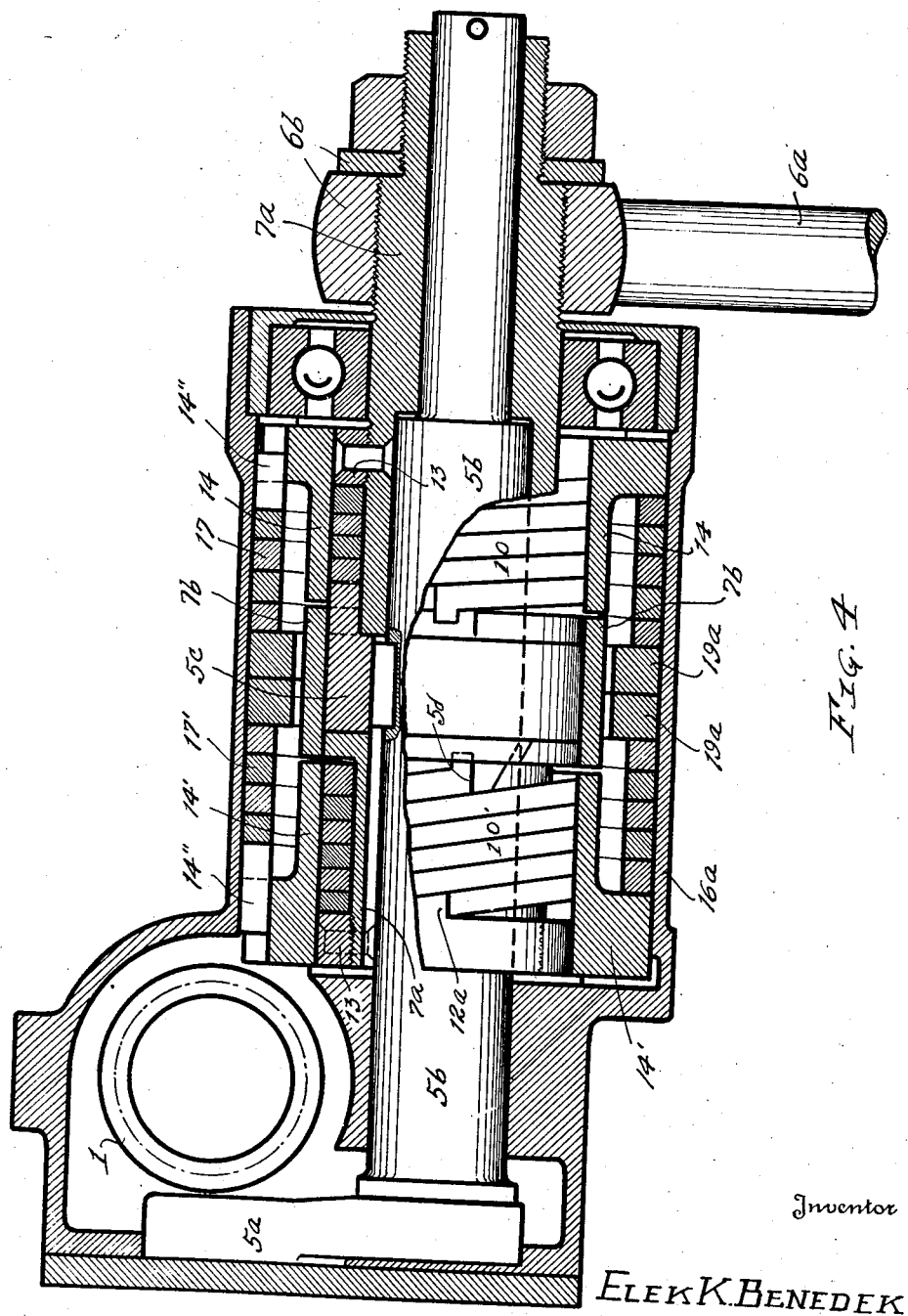

March 30, 1937.  E. K. BENEDEK  2,075,567
STEERING MECHANISM FOR VEHICLES
Filed Nov. 6, 1934  3 Sheets-Sheet 3
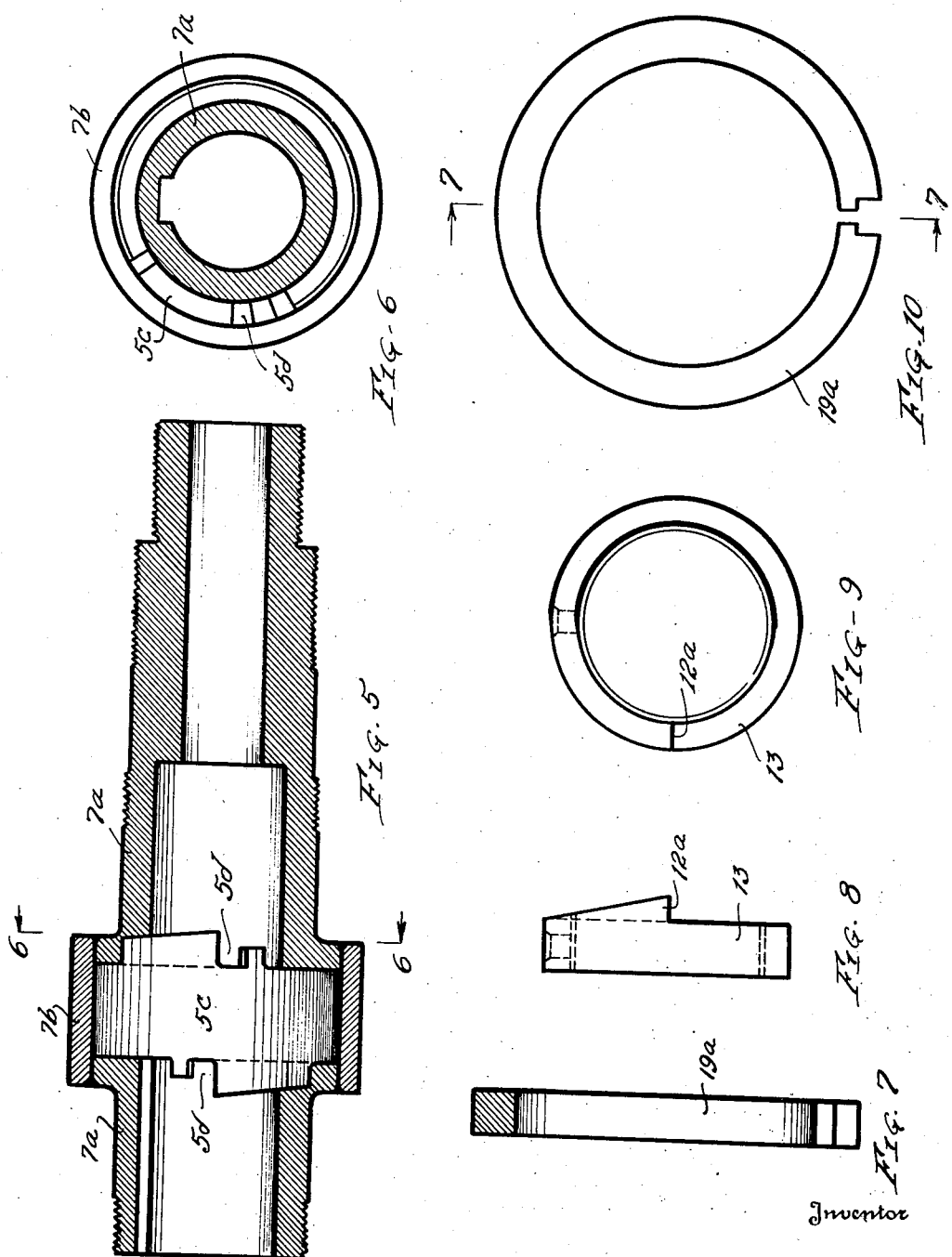
Inventor
ELEK K. BENEDEK
By Soule & Leonard
Attorneys Patented Mar. 30, 1937

2,075,567

UNITED STATES PATENT OFFICE 2,075,567

STEERING MECHANISM FOR VEHICLES

Elek K. Benedek, Bucyrus, Ohio, assignor of one-half to Paul von Vágó, Budapest, Hungary Application November 6, 1934, Serial No. 751,739

8 Claims. (Cl. 280—89)

In the usual steering apparatus for road vehicles wherein manually e. g. operated mechanism is used to control the position of the dirigible wheels, a sudden change in the relationship of such wheels to the roadway, as when a tire blowout occurs, or when the dirigible wheel on one side encounters an obstruction, inadequate provision is made to counteract the tendency for the steering mechanism to get out of the control of the driver.

The principal object of the present invention is the provision of steering mechanism wherein the dirigible wheels will be maintained in whatever position they are set by the driver notwithstanding sudden or unexpected changes in the relationship between the wheels and roadway.

A specific object is to provide a steering mechanism stabilizing device which, while not interfering in any manner with manual e. g. steering under normal conditions, will, under abnormal conditions such as above recited, automatically check any undesired turning of the dirigible wheels on the roadway.

A further object is to provide a steering mechanism having an automatic elastic friction ratchet device for maintaining the direction of travel of the vehicle on which used under circumstances such that a sudden unexpected change in the direction of travel might result in personal or property damage.

Further objects and features of the invention will become apparent from the following specification, wherein reference is made to the drawings in which Fig. 1 is a diagrammatic perspective view of a vehicle steering mechanism of a known type;

Fig. 2 is a transverse sectional view through the friction ratchet mechanism of one form of the invention;

Fig. 3 is a sectional view, the left hand portion of which is taken along the line 3a—3a on Fig. 2 and the right hand portion of which is taken along the line 3b—3b on Fig. 2;

Fig. 4 is a sectional view of a modified friction ratchet mechanism, the view corresponding in general to Fig. 2; and Figs. 5 to 10 are detail views of certain of the parts shown in Fig. 4.

In Fig. 1, 2 indicates diagrammatically the usual steering shaft and 2a' the reciprocating part positioned by the steering shaft and governing the steering lever 4—5—6; 6 being the lower arm of the lever. The arm 6 is connected by suitable linkage to conventional mechanism diagrammatically indicated at S for adjusting the dirigible wheels W.

As shown in Figs. 2 and 3, the mechanism is symmetrical about the plane of the control worm and steering lever and the steering shaft 2 carries a control worm 1 which is threadingly embraced by a suitable nut 3, guided in the housing 2a. The arm 6 is connected to the nut 3 by a two-part lever arm device 4—5, the parts of which form a fork embracing the nut, somewhat in conventional fashion. The parts 4 and 5 are secured together rigidly as by bolts 8 and are pivotally mounted on oppositely extending portions of a tube 7, which tube is rigid with the arm 6. The arm members 4 and 5 are permitted limited rotational movement relative to the tube 7 of the arm 6 for enabling the action of the ratchet mechanism which will now be described.

The operating connection between the arm members 4—5 and the tube 7 comprise, as shown, flat face coil springs 10 and 10' disposed in respective sleeves 14 and 14', the ends of the springs operatively engaging slots 11 (one shown) in the respective members 4 and 5 and respective abutments in the nature of ratchet teeth 12a (one shown) of wheels 12 and 12'. As shown, the wheels 12 and 12' are keyed to the respective ends of the tube 7 and it is assumed that the springs are symmetrical and both are wound the same way (right hand e. g.). Further, the ratchet tooth effect of the wheel 12' abuts the end of the spring 10' from a direction rotationally opposite the direction of abutment illustrated at 12a.

Thus when the steering wheel is operated to turn the arm 4—5, from a central position, in the direction of the arrow 9, Fig. 2, the lever 6 will, through the spring 10 and tube 7, be correspondingly turned, no appreciable force being exerted or transmitted by the spring 10'. Also, when the arm 4—5 is turned in the opposite direction, the arm 6 will be turned in said opposite direction but by the spring 10'. In each case one spring only operates to turn the tube 7 and the other is relieved from turning its sleeve 14 or 14' as the case may be. It will be noted that when the springs 10 and 10' are transmitting motion from the arm 4—5 to the tube 7 excessive expansion of the springs will be prevented by the sleeves 14 and 14' which closely embrace the peripheral surfaces of the respective springs, and the sleeve of the spring which, depending on the direction of rotation, is transmitting torque to the tube will turn with said spring.

In order to provide an automatic check or brake for the arm 6 when tending to be rotated by the road wheels, as distinguished from rotation by exertion of the driver on the steering wheel, friction ratchet springs 17 and 17' are operatively disposed between the respective sleeves 14 and 14' and the stationary housing members 16 and 16'. These springs may be of the same general nature as the springs 10 and 10' but are wound opposite the direction of springs 10 and 10'. In other words, in the present instance, both are left hand wound springs. One end of each spring is suitably secured to a respective flange portion 14a of one of the sleeves 14 and 14' and the opposite end of each is suitably secured to an "energizing" friction ring in the nature of an expanding type brake, shown as comprising paired shoes 19 actuated to engage the inner surface of the housing member 16 or 16' by a suitable compression spring 18 located between the shoes as shown at the left of Fig. 3. These friction rings are for placing initial friction drag on the springs 17 and 17' insuring that the springs will expand and grip the respective housings on rotation in a predetermined direction being imparted to either one of the springs by the respective sleeves.

If both ratchet springs 17 and 17' are wound as left hand springs, the actuation of the same by rotary motion transmitted to the ends of the ratchet springs by the flanges 14a in one direction with respect to a given spring will be idle, that is, will tend to wind up the spring. However, turning of the same spring in the opposite direction will tend to unwind the spring and expand it due, in the form shown, to the anchoring effect of the brake shoes on the extreme spring ends or to an equivalent restraining force opposing free rotation of the springs in their housings.

The operation of the stabilizing ratchet arrangement above described is as follows:

Assuming the nuts and arm parts 4, 5 are in the position illustrated in Fig. 3 (central position) and that, by virtue of a tire blowout e. g., the lever 6 attempts to move the rotary steering connections in the direction reverse to the arrow 9, the abutment 12a acts to unwind and expand the spring 10 thereby causing the sleeve 14 to be turned with the wheel 12, whereupon the sleeve 14, through its flange 14a, tends to unwind the spring 17 and causes the latter to grip the adjacent housing surface and the movement of the arm 6 is thereby automatically checked. On the other hand, should the sudden movement occasioned by the condition of the road wheels be to move the arm 6 in the direction of arrow 9 then the connection at 10'—12a, being just the reverse of 10—12a, will result in turning of the sleeve 14' in the direction of the arrow 9 to energize the ratchet spring 17' with the effect of checking impartation of turning force to the remainder of the steering mechanism, the nut 3, worm 1, etc.

Thus the device cooperates at all times with the normal well known forces tending to maintain road stability (straightaway travel) when the driver frees the steering wheel, and when the driver is turning a curve he has only to exert a slight detaining force on the wheel to hold the steering mechanism in the desired turning position. This latter action follows from the fact that any sudden or abnormal force coming from the dirigible wheels and tending to react on the steering wheel to disturb the manual setting will be checked by one or the other of the ratchet springs 17 and 17' and associated mechanism above described.

Referring to Figs. 4 to 10, this shows the worm and associated mechanism at one end of the general housing 16a (containing the ratchet mechanism) and the steering arm 6a at the other end. The arm 5a, Fig. 4, is rigid on a central shaft 5b projecting entirely through the housing 16a and carrying a suitable collar at 5c, corresponding in operative effect to the wheels 12 and 12' of the previously described construction. This collar 5c is connected through abutment recesses 5d to springs 10 and 10', arranged approximately as previously described, so that turning of the shaft 5b in one direction tends to unwind the spring 10 and wind the spring 10', whereas turning of the shaft in the opposite direction tends to unwind the spring 10' and wind the spring 10. The collar 5c is mounted for limited turning movement in and relative to a composite tubular shaft 7a to one end of which the dirigible wheel steering arm 6a is rigidly connected as at 6b.

The two parts of the tube 7a (see Figs. 5 and 6) are made mutually rigid by a welded on collar 7b. The tube 7a carries rings 13 (see Figs. 8 and 9) rigid thereon, each ring having an abutment 12a essentially similar in operative effect to the abutments 12a of the previously described construction. The springs 10 and 10' are embraced by sleeves 14 and 14' respectively and these are connected as at 14'' to the ends of respective ratchet springs 17 and 17' wound opposite the springs 10 and 10' (left hand wound e. g.) and in working relation to the inner cylindrical surfaces of the housing 16a. The inner (adjacent) ends of the springs 17 and 17' extend between the nearly meeting ends of respective expanding friction rings 19a which are stressed to seat forcibly in the mating cylindrical surfaces of the housing 16a for the purpose of "energizing" the springs 17 and 17' when the latter are given a tendency to unwind by the respective sleeves 14 and 14'.

It will be seen that the arrangement of Fig. 4 operates essentially as does the Fig. 2 arrangement; steering being accomplished through the arm 5a without retardation by the ratchet devices and the dirigible wheel imparted impulses on the arm 6a being checked by the combined action of the springs 10, 17 and associated parts or the springs 10', 17' and associated parts depending on the direction of a given impulse on the arm 6a.

I claim:

1. In a vehicle steering mechanism, a steering element adapted to be moved in opposite directions and having means associated therewith to steer the vehicle in respective directions when so moved, an actuating means for said element adapted to be manually operated, and oppositely acting elastic friction members, and cooperating friction means operative to check movement of said element in said respective directions consequent upon motion being imparted thereto independently of the actuating means, and means on the actuating means and on said steering element cooperating with certain of the elastic friction members for transmitting motion from the actuating means to the steering element through the medium of the said certain elastic friction members.

2. In a vehicle steering mechanism, a steering arm operably connected to a dirigible element of a vehicle, means to actuate the same to steer the vehicle, and a pair of spiral expanding friction springs and fixed housings embracing the same, said springs being operatively associated with said arm, and means rendering the springs alternately active respectively in the housings to check the arm on imposition of turning forces thereon in respective directions by said dirigible element independently of the actuating means.

3. In a vehicle steering mechanism, a housing, a compound steering lever including a normally impelling arm and a normally impelled arm, said arms having rotary lost motion connection with each other, two oppositely acting ratchet connections between the arms whereby the impelling arm turns the impelled arm irrespective of the direction of turning of the impelling arm, and oppositely acting friction means to automatically check turning movement in either direction of the impelled arm occasioned independently of the impelling arm.

4. In a vehicle steering mechanism, a housing, coaxially pivoted arms, one connected with a dirigible element of the vehicle, actuating means for the other arm, a pair of spiral ratchet springs coaxial with the pivot and being alternately active and inactive to transmit motion from said other arm to the arm connected with said element, each in a different direction, sleeves surrounding said springs and adapted to be turned frictionally by engagement of the springs therewith when active as aforesaid, and friction detent means operatively connected with the sleeves and acting on the housing to check movement of the arm connected with the dirigible element imparted thereto by said element independently of the actuating means.

5. Mechanism according to claim 4, wherein the friction detent means comprises a pair of spiral springs adapted to expand when turned in respective directions to frictionally engage the housing.

6. In a steering mechanism, a manually operated control means, a dirigible means to be moved in either direction thereby, a pair of expanding springs operatively interposed between the control means and dirigible means, one spring for imparting movement in one direction of the control means to the dirigible means and the other spring for imparting opposite movement of the control means to the dirigible means, said springs operatively releasing from the dirigible means respectively upon movement of the springs by the control means in directions opposite to their movement transmitting directions respectively, and each spring being elastically deformed consequent upon operation of the control means in the direction to impart movement to the dirigible means therethrough, a movable member for each spring, said member being frictionally engaged by its associated spring consequent upon said deformation of the associated spring for movement with the associated spring, and means operatively interposed between each said movable member and the dirigible means and cooperating with the associated member to permit movement of the member with and by the associated spring in said movement transmitting direction of said springs and to prevent movement of the member in the opposite direction while said member is frictionally engaged by the spring, whereby thrusts on the dirigible element are not transmitted to the control means.

7. In a steering mechanism, a manually rotatable control element, a dirigible device including a pair of rotatable elements fixedly secured to the dirigible device for rotation therewith in either direction, a pair of transmitting coil springs, each spring being connected by one of its ends to the manual control element and abutting, at its opposite end, one of the rotatable elements respectively for transmitting rotary motion from the control element to the associated rotatable dirigible element, said springs operating with respect to each other to transmit opposite rotary motion from the control element respectively, and each spring being operable to release from its associated rotatable element upon movement in the direction opposite from its rotation transmitting direction by the control element and each spring being elastically deformed consequent upon forces imposed thereon by either the control element or the dirigible element, rotatable friction drums for the springs respectively, each drum being arranged to be frictionally engaged by its associated spring consequent upon deformation of the associated spring and to be released by its associated spring consequent upon movement of the associated spring in the opposite direction by the manual control element, additional coil springs, each being connected at one end to one of the drums, stationary friction means for each additional spring, each friction means being arranged to be disengaged by the associated additional spring when the associated drum is moved by the associated transmitting spring through the medium of the manual control element, and to be frictionally engaged by the associated additional spring when the associated drum is moved by the rotatable dirigible element through the medium of the associated transmitting spring.

8. In a steering mechanism, a rotatable manual control element, coaxial rotatable dirigible elements, coil springs, each spring being connected at one end to the manual control element and each spring abutting, at its opposite end, a different one of the rotatable dirigible elements for transmitting rotary motion from the manual control element to the associated rotatable dirigible element, each spring acting for rotating its associated dirigible element in a direction opposite from the other and being expansible consequent upon forces imposed on the spring by the manual control element and its associated dirigible element, and each spring being releasable from its associated dirigible element consequent upon movement of each spring by the manual control element in a direction opposite to the rotation transmitting direction, freely rotatable drums surrounding the respective springs and being frictionally engaged thereby for rotation therewith consequent upon expansion of said springs, additional coil springs, each additional spring being connected at one end to a different one of said drums, stationary friction surfaces for the additional springs respectively, each of said additional springs being expansible consequent upon rotation of the associated drum by the dirigible member and frictionally engaging said friction surfaces when expanded for arresting said rotation of the associated drum, and being released from said friction surfaces consequent upon rotation of the drum associated by the manual control element through the medium of the first mentioned associated spring.

ELEK K. BENEDEK.